(12) United States Patent
Baker

(10) Patent No.: US 9,317,931 B2
(45) Date of Patent: Apr. 19, 2016

(54) F-STOP WEIGHTED WAVEFORM WITH PICTURE MONITOR MARKERS

(71) Applicant: Tektronix, Inc., Beaverton, OR (US)

(72) Inventor: Daniel G. Baker, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 115 days.

(21) Appl. No.: 14/313,794

(22) Filed: Jun. 24, 2014

(65) Prior Publication Data

US 2015/0287216 A1 Oct. 8, 2015

Related U.S. Application Data

(60) Provisional application No. 61/975,566, filed on Apr. 4, 2014.

(51) Int. Cl.
| | |
|---|---|
| G06K 9/00 | (2006.01) |
| G06T 7/40 | (2006.01) |
| G06T 7/00 | (2006.01) |
| H04N 5/222 | (2006.01) |
| H04N 5/232 | (2006.01) |
| H04N 5/235 | (2006.01) |

(52) U.S. Cl.
CPC ............... *G06T 7/408* (2013.01); *G06T 7/0018* (2013.01); *H04N 5/2228* (2013.01); *H04N 5/2351* (2013.01); *H04N 5/23293* (2013.01); *G06T 2207/10004* (2013.01); *G06T 2207/10024* (2013.01); *G06T 2207/10152* (2013.01)

(58) Field of Classification Search
CPC ........... G06T 2207/10004; G06T 2207/10024; G06T 2207/10152; G06T 7/0018; G06T 7/408; H04N 5/2228; H04N 5/23293; H04N 5/2351

See application file for complete search history.

(56) References Cited

U.S. PATENT DOCUMENTS

| | | | | |
|---|---|---|---|---|
| 6,148,113 | A * | 11/2000 | Wolverton | .............. G06T 5/002 382/254 |
| 2003/0081141 | A1* | 5/2003 | Mazzapica | ......... H04N 1/40093 348/362 |
| 2009/0046155 | A1 | 2/2009 | Jacumet | |
| 2013/0332866 | A1* | 12/2013 | Johnson | ................. H04N 5/232 715/764 |

FOREIGN PATENT DOCUMENTS

| | | |
|---|---|---|
| EP | 1976307 A1 | 1/2008 |
| EP | 2332580 A1 | 6/2011 |

OTHER PUBLICATIONS

Cinelite On-Picture Exposure Measurements, http://www.leaderamerica.com/cinelite-cinezone-5-bar-display/, Dec. 31, 2014, 2 pages, Leader.
Focus Peaking, http://en.wikipedia.org/wiki/Focus_peaking, Dec. 31, 2014, 1 page, Wikipedia.
European Search Report, dated Jun. 17, 2015, EP Patent Application 15162453.3, 6 pages.

* cited by examiner

*Primary Examiner* — Phuoc Tran
(74) *Attorney, Agent, or Firm* — Marger Johnson

(57) ABSTRACT

A waveform monitor for generating a modified image from an original image includes a brightness measuring system to generate brightness values that are then converted to f-stop equivalents. A selector is used to create a range of f-stop values and a modifier changes the original image for selected pixels that fall within the range of f-stop values. The original image may be modified by replacing or blending certain pixels with colorized pixels, i.e., by falsely coloring the original image. Methods of modifying images in this manner are also described.

19 Claims, 6 Drawing Sheets
(1 of 6 Drawing Sheet(s) Filed in Color)

F-STOP WEIGHTED WAVEFORM WITH PICTURE MONITOR MARKERS

CROSS REFERENCE TO RELATED APPLICATIONS

This application claims benefit of U.S. Provisional application 61/975,566, entitled F-STOP WEIGHTED WAVEFORM DISPLAY WITH PICTURE MARKERS VIA CURSORS, filed on Apr. 4, 2014, the teachings of which are incorporated herein by reference.

TECHNICAL FIELD

This disclosure is directed to a method of displaying information on a monitor, and, more particularly, to an apparatus to monitor a camera output signal waveform, and associated methods of use.

BACKGROUND

"On-set" or "on-site" video and film production often requires the use of incident and reflected (spot) light-meters to adjust scene lighting and camera gain or aperture. Many times the light-meter measurement and lighting adjustments are done in relative values such as F-stops. F-stops are well known and derive from film exposure and camera aperture or speed adjustment, which is typically adjusted in F-stop increments. The so called F-stop derives from the Focal Ratio or F-number, a dimensionless ratio of focal-length divided by the effective aperture of the camera lens. For example, one f-stop, or "stop", corresponds to an area increase of 2× or 3 dB in light power but the F-number changes by only sqrt(2). It is typically the F-number that is marked on the lens iris or aperture adjustment.

Presently, both film production and video production use electronic imagers within the cameras typically providing a very large dynamic range and adjustable gain (6 dB/stop). For example, according to Wikipedia, film negatives have about 13 stops compared to 14.4 stops for a typical (e.g., Nikon D800) DSLR camera. In video and movie film production, the traditional Gamma (power-law) correction as well as newer log processing within the camera can maintain a large portion of that dynamic range when compressed into a 12-bit or even 10-bit resolution digital video output. It is very important to determine how well that dynamic range is being utilized based on camera adjustment (gain/aperture) and scene lighting. Typically this is done on the camera output signal by viewing the output on a picture monitor (<10 stops of dynamic range). Also note that by simply looking at a well calibrated picture monitor, the dynamic range is limited by the adapted eye to about 7 stops, which leaves invisible detail in the dark portions of the output. A video Waveform Monitor is often also used, but currently these Waveform Monitors are limited to linear voltage indications, with much of the dynamic range near black compressed into just a few mV near 0. Much like the case for analyzing high dynamic range Radio Frequency (RF) signals, a linear waveform scaling is not adequate.

Embodiments of the invention address these and other issues in the prior art.

SUMMARY OF THE DISCLOSURE

Embodiments of the invention include a real-time method and apparatus to monitor the camera output signal waveform with a weighting that provides the combination of removing the gamma or other non-linear correction applied to the camera imager with the conversion of the waveform to a log2, "f-stop", weighted waveform display with calibrated graticule and cursors.

In addition, embodiments include a method and apparatus to allow selection of regions of the calibrated f-stop weighted waveform with adjustable markers or cursors reading out in f-stop values. These adjustable markers preferably provide corresponding indications on a picture display of the regions of the camera image corresponding to the selected f-stop value of the marker.

Particular embodiments include a waveform monitor for generating a modified image from an original image include a brightness measuring system to generate brightness values that are then converted to f-stop equivalents. A selector is used to create a range of f-stop values and a modifier changes the original image for selected pixels that fall within the selected range of f-stop values. The original image may be modified by replacing or blending those pixels with colorized pixels, i.e., by falsely coloring the original image. Methods of modifying images in this manner are also described.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As mentioned above, embodiments of the invention may be used to assess a live video signal from a cameras in terms of relative f-stops (log2 scale) as well as the traditional, linearly displayed, voltage or IRE level. This effectively converts even an analog camera output into a light-meter for relative lighting and exposure in terms of "stops" or "f-stops".

Figure 1:
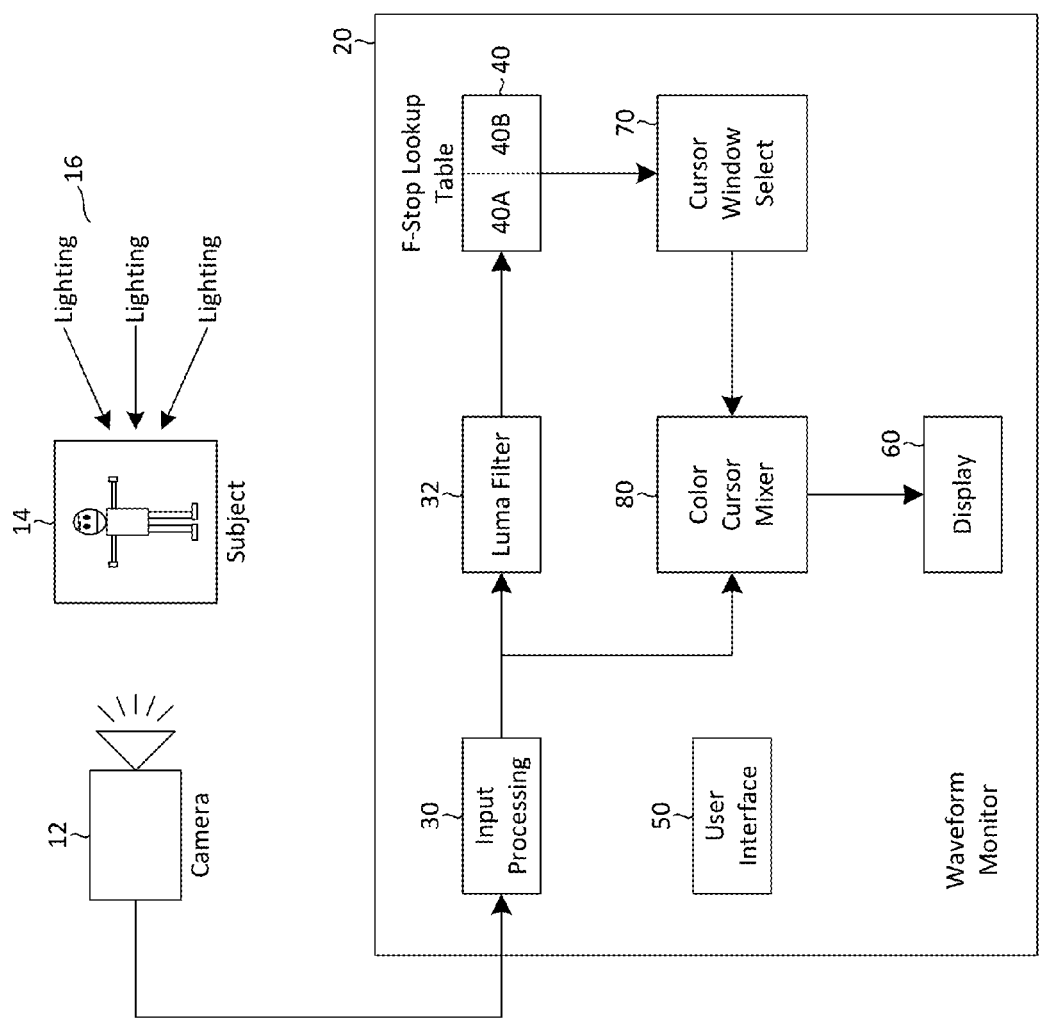
FIG. 1 is a block diagram of an example Video Waveform Monitor including monitor markers according to embodiments of the invention.

FIG. 1 is a block diagram showing material portions of an example Video Waveform Monitor according to embodiments of the invention. As illustrated in FIG. 1, a Waveform Monitor 20 is coupled to and receives input from a camera 12 that is pointed at a subject 14 that is lit by lighting 16. The camera 12 typically includes adjustments for aperture and exposure index that may be controlled by a camera operator, or the adjustments may be automatically controlled. The camera output is input to the Waveform Monitor 20.

Figure 2A:
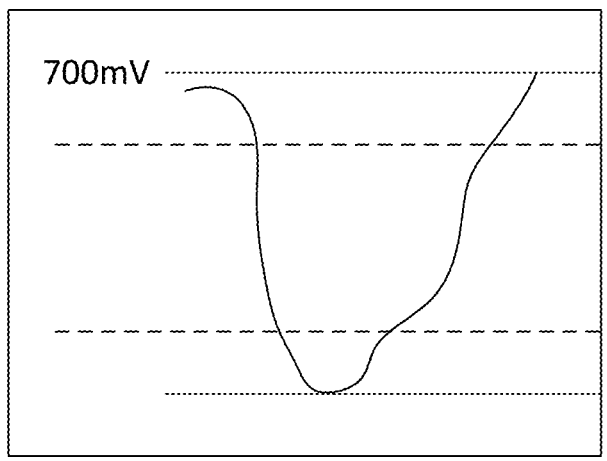
FIG. 2A is an example display output of a conventional voltage vs. time waveform.
Figure 2B:
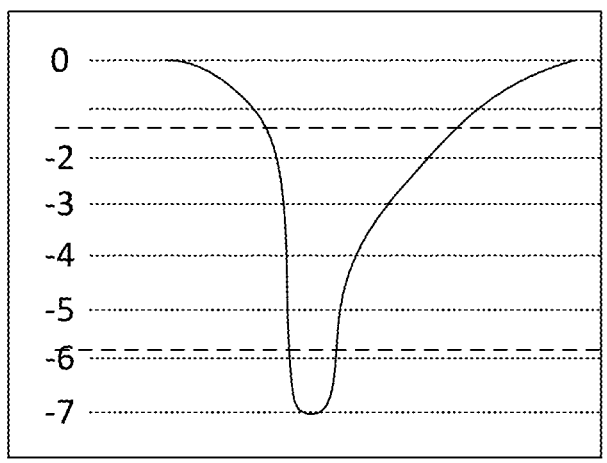
FIG. 2B is an example display output of a new f-stop vs. time waveform produced by the Waveform Monitor of FIG. 1.

The camera 12 output is first processed by an input processor 30 before passing through a filter 32, such as a low pass filter, that may be turned on or off by the user, such as through a user interface 50. The filtered or non-filtered output is fed to a Look Up Table (LUT) 40 that has been loaded with preset tables through the user interface 50. One portion of the LUT 40, 40A, may be used to remove the gamma or log processing on the luma signal. This process converts the luma signal to a linear light representation. Another portion of the LUT 40, 40B, may be used to convert the luma signal to a $Log_2(Y/Ymax)$ scale to provide a real-time, f-stop luma signal for a waveform display, such as illustrated in FIG. 2B. To reduce the size of the LUTs, both mathematical processes are typically multiplied and scaled with high precision before converting to a single set of integer LUT words, thereby eliminating the need for the large word size needed to represent the wide dynamic range of linear light values.

There may be multiple LUTs stored in the Waveform Monitor 20. The user may use the user interface 50 to control which of the stored LUTs is loaded as the active LUT 40. For example, various LUTs may be pre-stored in the Waveform Monitor 20 that allow user to select the active LUT 40 based on camera gamma and black level.

A display monitor 60 on the Waveform Monitor 20 displays output to the user. While the monitor 60 may be used to show the traditional voltage vs. time waveform, such as illustrated in FIG. 2A, it may also be used to show a new f-stop vs time waveform, such as illustrated in FIG. 2B. The new f-stop vs time waveform display may use the same user-adjustable cursors as the traditional voltage vs time display, except the output is scaled in "stops" rather than voltage. The horizontal time base is the same for both displays, as illustrated in FIGS. 2A and 2B, having the conventional selections such as 1-line, 2-line and field sweeps, for example.

In addition, a cursor window select block 70 may accept user input from the user interface 50 to read adjustable cursor values set by the user. These adjustable cursor values may be used as binary gate signals to modify an otherwise monochrome output of the Waveform Monitor 20. More specifically, a color cursor mixer 80 may be coupled to receive the processed input signal from the input processor 30, or from elsewhere in the Waveform Monitor 20. The color cursor mixer 80 is also coupled to the cursor window select block 70. Binary gate signals from the cursor window select block 70 may be used to determine which areas of the original monochrome output will be colored, thus highlighting particular regions of the output, as described below.

Figure 3:
FIG. 3 is a base image capture used to illustrate embodiments of the invention.
Figure 6:
FIG. 6 is the image capture of FIG. 3 that has been modified with color highlighting according to embodiments of the invention.

For example, comparing output FIGS. 3 and 6, FIG. 3 is an original monochrome output, while the output of FIG. 6 is the original monochrome picture that has been highlighted in color to identify areas of the picture that fall within the f-stop windows selected by the user. Whereas the image capture shown in FIG. 3 is a Luma-only or monochrome picture, in FIG. 6 two color windows are added, for example red and blue, as described in more detail below.

To produce the output of FIG. 6, with reference back to FIG. 1, the $log_2(Y)$ signal from the LUT 40, and specifically from the LUT 40B, is compared with two user controllable window detectors in the control block 70. Users may control the position and size of cursor "windows". More specifically, in one embodiment, users may control the center f-stop value as well as the size of the cursor window. The window is used by the system to create binary gate signals. F-stop values from the luma output falling within the specified cursor window are shown on the display as colored pixels, providing information to the user about which pixels in the output fall within the f-stop window. The remaining pixels, i.e., those pixels having brightness levels outside of the specified cursor window from the original image, may be shown on the display without change.

Windows may be adjusted in, for example, ¼ stop (f-stop) increments. For example, the window could be pre-configured to plus and minus ¼ stop from the user controllable center f-stop value adjustable over the entire range of the signal from the LUT 40. In this way, the user can adjust the cursor to highlight any particular region of the picture to determine from the cursor value on the f-stop waveform in FIG. 2B or FIG. 5 the f-stop value, within ¼ stop, of that particular region of the picture as well as other regions with substantially the same f-stop value.

The color cursor mixer 80 generates the coloring signals, for example the red and blue pixels for combining with the original image to produce the modified image as illustrated in FIG. 6. In one embodiment the color cursor mixer 80 merely replaces the original pixels that fall within the f-stop window with monochromatic red or blue, for instance. In other embodiments the color cursor mixer 80 may generate a blended output by adding a color hue to the underlying luma data. Also, although these examples show a monochrome base image, embodiments of the invention are not limited to luma only, and may be performed in each color channel, for example red, green, blue, independently.

In the illustrated embodiment of FIG. 6, two colored cursor windows are presented, although more or fewer windows could be produced by the Waveform Monitor 20.

Figure 4:
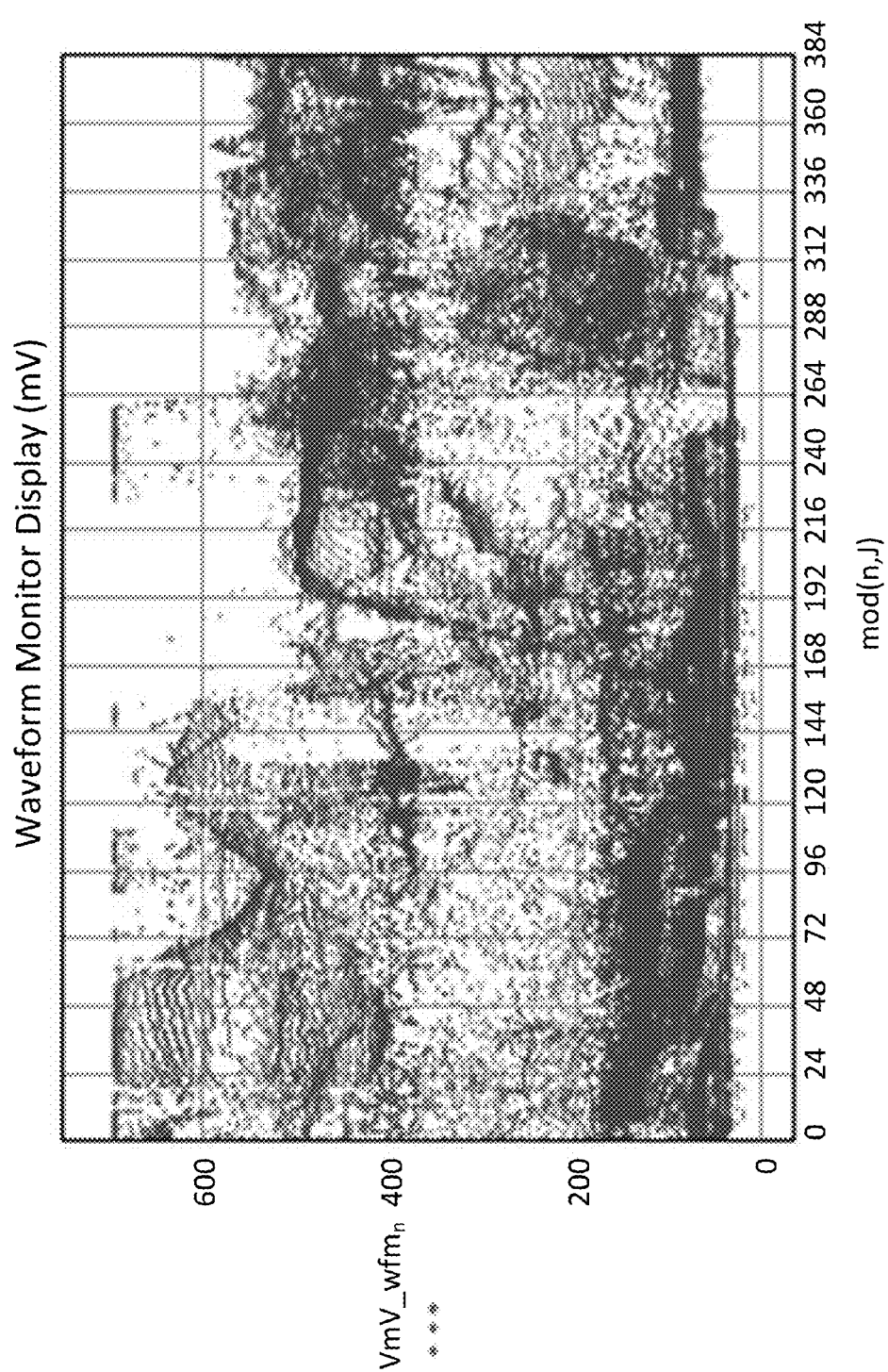
FIG. 4 illustrates a traditional voltage waveform for the image of FIG. 3
Figure 5:
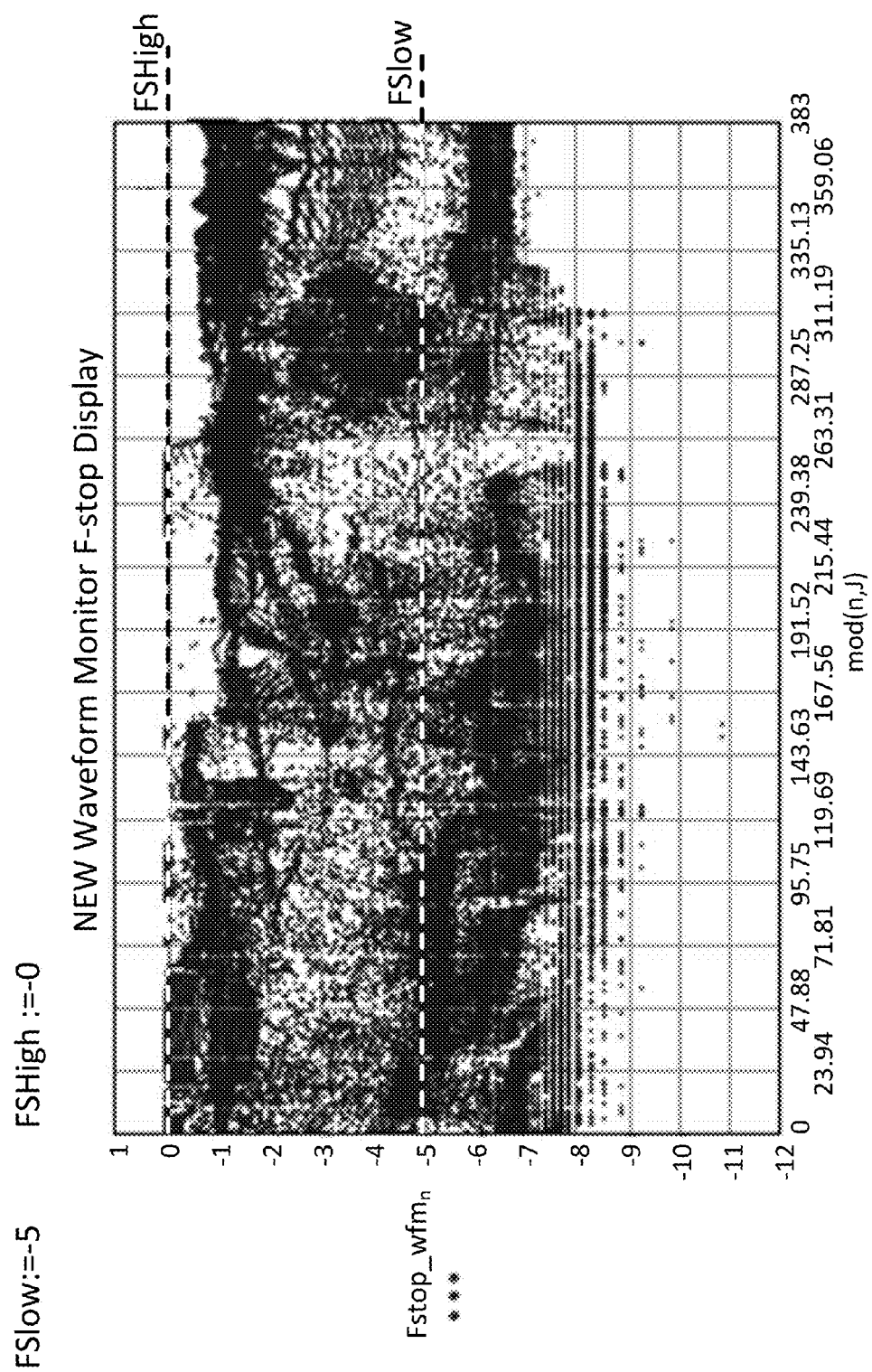
FIG. 5 illustrates an f-stop waveform for the image of FIG. 3, with cursors FSLow and FSHigh, according to embodiments of the invention.

FIG. 4 illustrates the traditional voltage waveform for the image of FIG. 3. FIG. 5, shows a similar output for the original image of FIG. 3, except that FIG. 5 shows an f-stop waveform for the image of FIG. 3, with cursors FSLow and FSHigh, according to embodiments of the invention.

Using embodiments of the invention facilitates camera gain/aperture/speed adjustment along with scene lighting in familiar f-stop units, effectively turning the camera into light meter. For example, using embodiments of the invention allow the user to see on a display an F-stop weighted waveform indication with graduated linear scale in stops, such as illustrated in FIG. 5. Embodiments also allow the user to measure scene hot spots and lighting uniformity in f-stops with dual cursors, by allowing the user to control delta f-stop difference measurement of picture/scene content elements through both waveform and false colored regions on a monochrome picture display. Embodiments further allow for high resolution black balance indications for camera matching and precise black level adjustment and indication of camera noise. Further, embodiments of the invention provide a tool to the user for scene content dynamic range assessment, to allow for artistic optimization.

The Waveform Monitor 20, or any parts of it, may be embodied in firmware, such as an FPGA, specifically designed circuitry such as an ASIC, or may be implemented by one or more software process running on one or more processors. In other embodiments the Waveform Monitor 20 may include may include a combination of components or operations running on firmware, ASICs, FPGAs, and software, for example.

Although specific embodiments of the invention have been illustrated and described for purposes if illustration, it will be understood that various modifications may be made without departing from the spirit and scope of the invention.

What is claimed is:

1. A method of generating a display for output from a measurement instrument, the method comprising:
   receiving an original image formed of pixels;
   extracting brightness information from the pixels;
   converting the brightness information of the pixels to f-stop equivalents;

selecting f-stop equivalents that fall within a first range of f-stops;
modifying the original image by modifying original pixels that fall within the first range of f-stops to produce a modified image; and
displaying the modified image.

2. The method of generating a display according to claim 1, in which the width of the first range of f-stops is adjustable by a user.

3. The method of generating a display according to claim 1, in which the center of the first range of f-stops is adjustable by the user.

4. The method of generating a display according to claim 1, in which modifying the original image by modifying original pixels comprises replacing at least some of the original pixels that fall within the first range of f-stops with a colored pixel.

5. The method of generating a display according to claim 1, in which modifying the original image by modifying original pixels comprises combining brightness values of at least some of the original pixels that fall within the first range of f-stops with a color value.

6. The method of generating a display according to claim 1, further comprising:
selecting f-stop equivalents that fall within a second range of f-stops;
modifying the original image by modifying original pixels that fall within the second range of f-stops to produce the modified image, in which modifying original pixels that fall within the second range of f-stops is different than modifying original pixels that fall within the first range of f-stops.

7. The method of generating a display according to claim 6, in which modifying original pixels that fall within the first range of f-stops comprises modifying the original pixels by applying a first color and in which modifying original pixels that fall within the second range of f-stops comprises applying a second color.

8. A method of generating a display for output from a measurement instrument, the method comprising:
receiving an original image formed of pixels;
determining f-stop equivalents of the pixels; and
false coloring portions of the original image based on the f-stop equivalents to generate a modified image; and
displaying the modified image.

9. The method of generating a display according to claim 8, in which false coloring portions of the original image comprises replacing at least some of the original pixels that fall within a first range of f-stops with a colored pixel.

10. The method of generating a display according to claim 8, in which false coloring portions of the original image comprises combining at least some of the original pixels that fall within a first range of f-stops with a colored pixel.

11. A waveform monitor having an image input and a monitor for viewing a measurement display, the waveform monitor comprising:
a measuring system to measure brightness values for pixels from an original image received at the image input;
a converter structured to generate f-stop values from the brightness values;
a selector structured to create a range of f-stop values; and
a modifier structured to change the original image for selected pixels that fall within the range of f-stop values.

12. The waveform monitor of claim 11, in which the modifier is structured to replace the selected pixels with a colored pixel.

13. The waveform monitor of claim 11, in which the modifier is structured to combine the selected pixels with a colored pixel.

14. The waveform monitor of claim 11 in which the selector is user controllable.

15. The waveform monitor of claim 11 in which the selector is further structured to create a second range of f-stop values.

16. The waveform monitor of claim 15, in which the modifier is further structured to change the original image for selected pixels that fall within the second range of f-stop values.

17. The waveform monitor of claim 11, further comprising an output generator structure to generate an f-stop vs. time waveform.

18. The waveform monitor of claim 11, in which the converter structured to generate f-stop comprises a Look Up Table (LUT).

19. The waveform monitor of claim 18, in which the LUT is one of a plurality of previously stored LUTs accessible by the waveform monitor.

* * * * *